(12) United States Patent
Xiao et al.

(10) Patent No.: US 9,905,182 B2
(45) Date of Patent: *Feb. 27, 2018

(54) GOA DRIVING CIRCUITS, TFT DISPLAY PANELS AND DISPLAY DEVICES

(71) Applicant: Wuhan China Star Optoelectronics Technology Co., Ltd., Wuhan, Hubei (CN)

(72) Inventors: Juncheng Xiao, Guangdong (CN); Shangcao Cao, Guangdong (CN); Ronglei Dai, Guangdong (CN); Yao Yan, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 222 days.

This patent is subject to a terminal disclaimer.

(21) Appl. No.: 14/915,222

(22) PCT Filed: Jan. 5, 2016

(86) PCT No.: PCT/CN2016/070202
§ 371 (c)(1),
(2) Date: Feb. 27, 2016

(87) PCT Pub. No.: WO2017/080103
PCT Pub. Date: May 18, 2017

(65) Prior Publication Data
US 2017/0256224 A1   Sep. 7, 2017

(30) Foreign Application Priority Data

Nov. 9, 2015   (CN) .......................... 2015 1 0759416

(51) Int. Cl.
*G06F 3/041*   (2006.01)
*G09G 3/36*    (2006.01)

(52) U.S. Cl.
CPC ......... *G09G 3/3677* (2013.01); *G06F 3/0416* (2013.01); *G09G 2300/0408* (2013.01);
(Continued)

(58) Field of Classification Search
CPC ......... G09G 3/3677; G09G 2300/0408; G09G 2310/0251; G09G 2310/0283; G09G 2310/08; G06F 3/0416
See application file for complete search history.

(56) References Cited

U.S. PATENT DOCUMENTS

2006/0077157 A1* 4/2006 Arimoto .............. G09G 3/3648
345/87
2006/0097966 A1* 5/2006 Choi .................... G09G 3/3233
345/77

FOREIGN PATENT DOCUMENTS

CN         104091573 A    10/2014
CN         104485079 A     4/2015
(Continued)

Primary Examiner — Sejoon Ahn
(74) Attorney, Agent, or Firm — Andrew C. Cheng

(57) ABSTRACT

A GOA driving circuit, a TFT display panel and a display device are disclosed. The GOA driving circuit includes: an input module configured for outputting first control signals in accordance with the received display scanning signals and the touch scanning signals; an output module configured for outputting the first output control signals in accordance with the first control signals and the first clock signals; a pull-down module configured for outputting pull-down signals in accordance with the first control signals, the second control signals and the low level signals; and a pull-down maintaining module configure for outputting the second output control signals in accordance with the pull-down signals, the high level signals, and the first clock signals. The DC source is adopted to charge/discharge Qn to keep Qn at a reasonable (Continued)

level, and the transfer capability is enhanced. In addition, the forward scanning and the backward scanning may be implemented.

1 Claim, 3 Drawing Sheets

(52) U.S. Cl.
CPC .............. *G09G 2310/0251* (2013.01); *G09G 2310/0283* (2013.01); *G09G 2310/08* (2013.01)

(56) References Cited

FOREIGN PATENT DOCUMENTS

| | | |
|---|---|---|
| CN | 104575420 A | 4/2015 |
| CN | 205080895U A | 3/2016 |
| KR | 100940999 B1 | 2/2010 |

* cited by examiner

GOA DRIVING CIRCUITS, TFT DISPLAY PANELS AND DISPLAY DEVICES

BACKGROUND OF THE INVENTION

1. Field of the Invention

The present disclosure relates to display technology, and more particularly to a GOA driving circuit, a TFT display panel and a display device.

2. Discussion of the Related Art

Currently, horizontal scanning lines of active liquid crystal panels are driven by external IC, which can control the charge and discharge of the horizontal scanning lines level by level. The GOA (Gate Driver on Array) adopts conventional manufacturing process of liquid crystal panels to arrange the driving circuit of the horizontal scanning lines in a rim of the display area so as to replace the external IC. The GOA technology may decrease the bonding process of the external IC to reduce the cost. In addition, the manufactured liquid crystal panel may be more suitable for narrow border or borderless display products.

The GOA circuit mainly includes a pull-up part, a pull-up control part, a transfer part, a key pull-down part, and a pull-down holding part, and a boost capacitor for boosting the level.

Within the GOA circuit, the gate output capability is determined by the charging period and the charging method of the TFT gate outputting the scanning signals. The stability and the gate output quality of the GOA circuit may be affected when the level of the gate of the TFT cannot reach a certain high level.

In addition, as the load difference, the forward scanning method and the backward scanning method may cause different image quality. Therefore, it is another issue to optimize the images for the GOA circuit.

Thus, it is needed to provide a GOA driving circuit, a TFT display panel and a display device.

SUMMARY

In order to overcome the above problems, it is needed to provide a GOA driving circuit, a TFT display panel and a display device.

In one aspect, a GOA driving circuit includes: a plurality of driving unit at multiple levels, wherein each of the driving units includes: an input module is configured for receiving display scanning signals or touch scanning signals, output signals at a previous level, and the output signals at a next level, and is configured for outputting first control signals in accordance with the received signals; an output module is configured for receiving the first control signals and first clock signals, and is configured for outputting first output control signals in accordance with the first control signals and the first clock signals; a pull-down module is configured for receiving the first control signals, second clock signals, and low level signals, and is configured for outputting pull-down signals in accordance with the first control signals, the second clock signals, and the low level signals, wherein the second clock signals and the first clock signals are inversed; and a pull-down maintaining module is configured for receiving the pull-down signal, high level signals, and the first clock signals, and is configured for outputting second output control signals in accordance with the pull-down signals, the high level signals, and the first clock signals, wherein the first output control signals and the second output control signals cooperatively operate to obtain the output signals.

Wherein the input module includes a first transistor and a second transistor for receiving the display scanning signals, the scanning signals are high level scanning signals and low level scanning signals, wherein: a control end of the first transistor receives the output signals at the previous level, an input end of the first transistor receives the high level scanning signals or the low level scanning signals, and an output end of the first transistor outputs the first control signals; and a control end of the second transistor receives the output signals at the next level, an input end of the second transistor receives the high level scanning signals or the low level scanning signals, and the output end of the first transistor outputs the first control signals.

Wherein the input module includes a first transistor for receiving the touch scanning signals, wherein: a control end of the first transistor receives the output signals at the previous level, an input end of the first transistor receives the touch scanning signals, and an output end of the first transistor outputs the first control signals.

Wherein the output module includes a third transistor and a first capacitor, wherein: a control end of the third transistor connects to the output end of the second transistor to receive the first control signals, an input end of the third transistor receives the first clock signals, and an output end of the third transistor outputs the first output control signals; and two ends of the first capacitor respectively connects to the control end and the output end of the third transistor.

Wherein the output module includes a third transistor and a first capacitor, wherein: a control end of the third transistor connects to the output end of the second transistor to receive the first control signals, an input end of the third transistor receives the first clock signals, and an output end of the third transistor outputs the first output control signals; and two ends of the first capacitor respectively connects to the control end and the output end of the third transistor.

Wherein the pull-down signals includes first pull-down signals and second pull-down signals, and the pull-down module includes a fourth transistor and a fifth transistor, wherein: a control end of the fourth transistor connects to the output end of the second transistor to receive the first control signals, and an input end of the fourth transistor receives the second clock signals, and an output end of the fourth transistor outputs the first pull-down signals; and a control end of the fifth transistor receives the second clock signals, an input end of the fifth transistor receives the low level signals, and an output end of the fifth transistor outputs the second pull-down signals.

Wherein the pull-down maintaining module includes a sixth transistor, a seventh transistor, an eighth transistor, and a second capacitor, wherein: a control end of the sixth transistor receives the first clock signals, an input end of the sixth transistor connects to an output end of the seventh transistor, an output end of the sixth transistor connects to the control end of the third transistor; a control end of the seventh transistor respectively connects to the output ends of the fourth transistor and the fifth transistor to receive the pull-down signals, an input end of the seventh transistor receives the high level signals, an output end of the seventh transistor connects with the input end of the sixth transistor; a control end of the eighth transistor respectively connects with the output ends of the fourth transistor and the fifth transistor to receive the pull-down signals, an input end of the eighth transistor receives the high level signals, and an output end of the eighth transistor outputs the second output control signals; and one end of the second capacitor connects with the control ends of the seventh transistor and the eighth transistor, and the other end of the second capacitor receives the high level signals.

Wherein the first transistor through the eighth transistor are P-type transistors, the control end corresponds to a gate of the P-type transistor, the input end corresponds to a source of the P-type transistor, and the output end corresponds to a drain of the P-type transistor.

Wherein the GOA driving circuit further includes a ninth transistor, a control end of the ninth transistor receives the low level signals, an input end of the ninth transistor connects to the input module, and the output end of the ninth transistor connects to the output module.

In one aspect, a TFT substrate includes the above GOA driving circuit.

In one aspect, a display device includes the above TFT substrate.

In view of the above, the DC source is adopted to charge/discharge Qn. In this way, Q point is kept at a reasonable level, and the transfer capability is enhanced. In addition, the forward scanning and the backward scanning may be implemented. At the same time, the level of the first control signals may be prevented from being affected. In addition, only nine transistor and two capacitors are needed, which can reduce the IC cost.

DETAILED DESCRIPTION OF THE EMBODIMENTS

Figure 1:
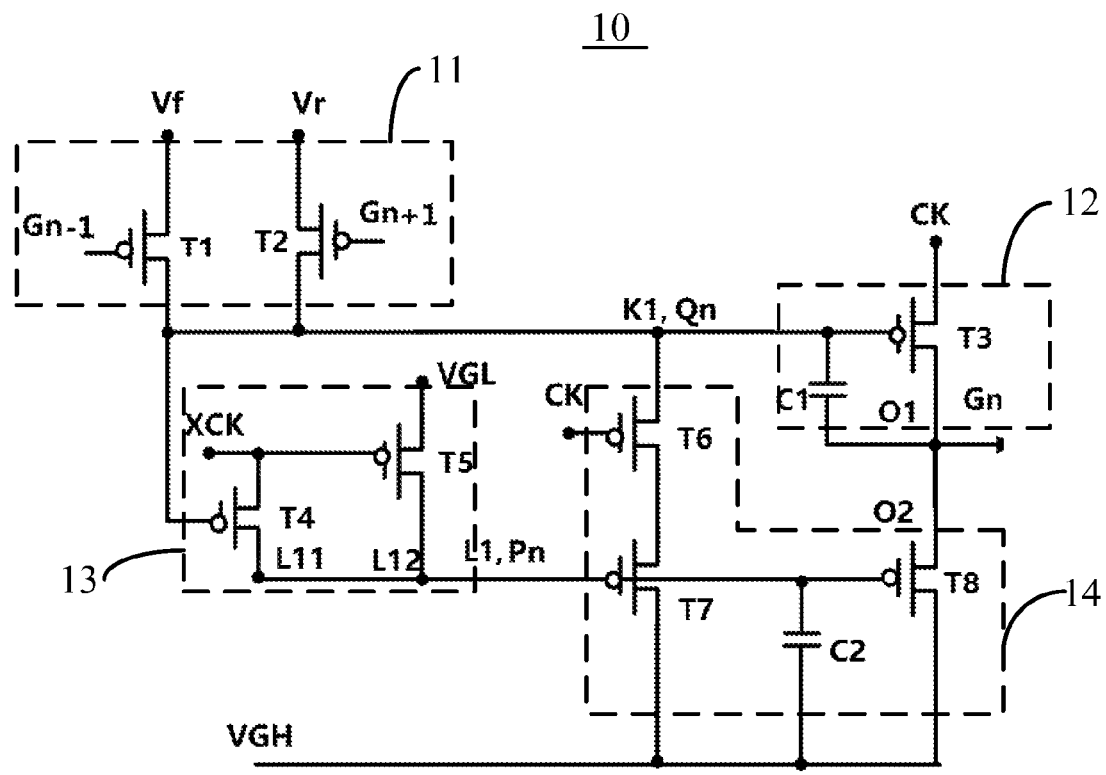
FIG. 1 is a schematic view of the GOA driving unit at the n-th level of the GOA driving circuit in accordance with a first embodiment.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

The GOA driving circuit includes driving units at multiple levels. The driving units at each of the levels receives display scanning signals or touch scanning signals, low level signals (VGL), high level signals (VGH), output signals at the previous level (Gn−1), output signals at the next level (Gn+1), first clock signals (CK) and second clock signals (XCK), wherein the driving unit at the first level receives the output signals from the previous level, which are the predetermined initial signals.

The structures of the GOA driving units at each levels are the same, and thus the GOA driving unit at the n-th level will be described hereinafter as one example.

FIG. 1 is a schematic view of the GOA driving unit 10 at the n-th level of the GOA driving circuit in accordance with a first embodiment. The GOA driving unit includes an input module 11, an output module 12, a pull-down module 13, and a pull-down maintaining module 14.

The input module 11 is configured for receiving the display scanning signals (Vf, Vr), the output signals at the previous level (Gn−1), and the output signals at the next level (Gn+1), and is configured for outputting first control signals (K1) in accordance with the received signals. The first control signals (K1) are outputted to the first node (Qn). The first node (Qn) is the node for controlling the output of the driving signals.

The output module 12 is configured for receiving the first control signals (K1) and the first clock signals (CK), and outputs first output control signals (O1) in accordance with the first control signals (K1) and the first clock signals (CK).

The pull-down module 13 is configured for receiving the first control signals (K1), the second clock signals (XCK), and the low level signals (VGL), and is configured for outputting pull-down signals (L1) in accordance with the first control signals (K1), the second clock signals (XCK), and the low level signals (VGL). Wherein the pull-down signals (L1) are outputted to the second node (Pn). The second node (Pn) is configured for keeping the output of the circuit stable during the non-operation period of the circuit. The second clock signals (XCK) and the first clock signals (CK) are inversed.

The pull-down maintaining module 14 is configured for receiving the pull-down signals (L1), the high level signals (VGH), and the first clock signals (CK), and is configured for outputting second output control signals (O2) in accordance with the pull-down signals (L1), the high level signals (VGH), and the first clock signals (CK), wherein the first output control signals (O1) and the second output control signals (O2) cooperatively operate to obtain the output signals (Gn).

Alternatively, the input module 11 includes a first transistor (T1) and a second transistor (T2). The control end of the first transistor (T1) receives the output signals at the previous level (Gn−1), the input end of the first transistor (T1) receives the first scanning signals (Vf), the control end of the second transistor (T2) receives the output signals at the next level (Gn+1), the input end of the second transistor (T2) receives the second scanning signals (Vr), the output ends of the first transistor (T1) and the second transistor (T2) cooperatively output the first control signals (K1). Specifically, the output ends of the first transistor (T1) and the second transistor (T2) connects with the first node (Qn) so as to output the first control signals (K1) to the first node (Qn).

The output module 12 includes the third transistor (T3) and the first capacitor (C1). The control end of the third transistor (T3) connects to the output ends of the first transistor (T1) and the second transistor (T2) to receive the first control signals (K1). Specifically, the control end of the third transistor (T3) connects with the first node (Qn) such that the first node (Qn) may receive the first control signals (K1) outputted by the first transistor (T1) and the second transistor (T2). The input end of the third transistor (T3) receives the first clock signals (CK), and the output end of the third transistor (T3) outputs the first output control signals (O1). The first capacitor (C1) is the boost capacitor for boosting the level. Two ends of the first capacitor (C1) respectively connects to the control end and the output end of the third transistor (T3). That is, one end of the first capacitor (C1) and the control end of the third transistor (T3) connects with the first node (Qn).

In the embodiment, the pull-down signals (L1) include first pull-down signals (L11) and second pull-down signals (L12). The pull-down module 13 includes a fourth transistor (T4) and a fifth transistor (T5). The control end of the fourth transistor (T4) connects with the output ends of the first transistor (T1) and the second transistor (T2) to receive the first control signals (K1). Specifically, the control end of the fourth transistor (T4) and the output ends of the first transistor (T1) and the second transistor (T2) connects with the first node (Qn). The input end of the fourth transistor (T4) receives the second clock signals (XCK), the output end of the fourth transistor (T4) outputs the first pull-down signals (L11). Specifically, the output end of the fourth transistor (T4) connects to the second node (Pn) so as to output the first pull-down signals (L11) to the second node (Pn). The control end of the fifth transistor (T5) receives the second clock signals (XCK), the input end of the fifth transistor (T5) receives the low level signals (VGL), and the output end of the fifth transistor (T5) outputs the second pull-down signals (L12). Specifically, the output end of the fifth transistor (T5) connects to the second node (Pn) so as to output the second pull-down signals (L12) to the second node (Pn).

The pull-down maintaining module 14 includes a sixth transistor (T6), a seventh transistor (T7), an eighth transistor (T8), and a second capacitor (C2). The control end of the sixth transistor (T6) receives the first clock signals (CK), the input end of the sixth transistor (T6) connects to the output end of the seventh transistor (T7), the output end of the sixth transistor (T6) connects to the first node (Qn) so as to connect with the control end of the third transistor (T3) via the first node (Qn). The control end of the seventh transistor (T7) respectively connects to the output ends of the fourth transistor (T4) and the fifth transistor (T5) to receive the pull-down signals (L1). The input end of the seventh transistor (T7) receives the high level signals (VGH). The output end of the seventh transistor (T7) connects with the input end of the sixth transistor (T6). The control end of the eighth transistor (T8) respectively connects with the output ends of the fourth transistor (T4) and the fifth transistor (T5) via the second node (Pn) to receive the pull-down signals (L1). The input end of the eighth transistor (T8) receives the high level signals (VGH), and the output end of the eighth transistor (T8) outputs the second output control signals (O2). One end of the second capacitor (C2) connects with the control ends of the seventh transistor (T7) and the eighth transistor (T8), and the other end of the second capacitor (C2) receives the high level signals (VGH).

In the embodiment, the first transistor (T1) through the eighth transistor (T8) are P-type transistors. The control end corresponds to the gate of the P-type transistor, the input end corresponds to the source of the P-type transistor, and the output end corresponds to the drain of the P-type transistor.

Figure 2:
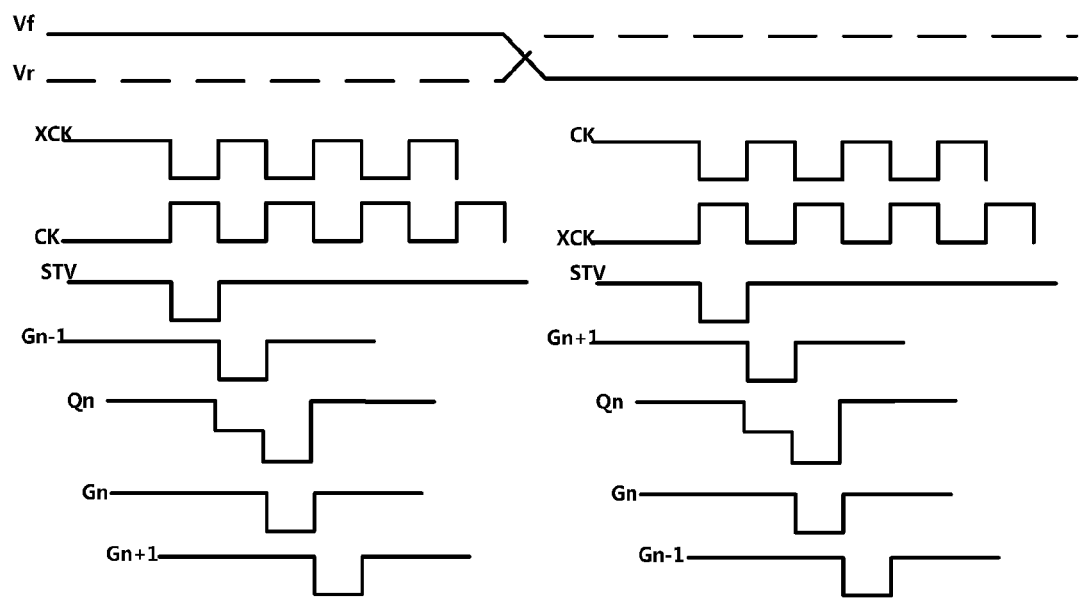
FIG. 2 is a driving timing diagram of the GOA driving unit in accordance with the first embodiment.

FIG. 2 is a driving timing diagram of the GOA driving unit in accordance with the first embodiment. When the forward scanning is adopted, the first scanning signals (Vf) and the second scanning signals (Vr) are respectively the low level scanning signals and the high level scanning signals. When the backward scanning is adopted, the first scanning signals (Vf) and the second scanning signals (Vr) are respectively the high level scanning signals and the low level scanning signals. In an example, the forward scanning may include four phases:

Phase one: the first transistor (T1) is turned on, the first scanning signals (Vf) pulls down the first node (Qn) to the low level. The second transistor (T2) and the third transistor (T3) are turned on, and the second node (Pn) is at the low level. The first clock signals (CK) are at the high level, the fourth transistor (T4) is turned off, the fifth transistor (T5), the sixth transistor (T6), and the seventh transistor (T7) are turned on.

Phase two: the first clock signals (CK) are at the low level, and Gn outputs the low level. In one aspect, the pixel units within the display area (AA area) of the thin film transistor (TFT) substrate may be driven. On the other hand, the signals may be the transfer signals to be transmitted to the driving unit at the next level.

In addition, the third transistor (T3) is turned on. The second node (Pn) transits to the high level via the second clock signals (XCK). The fifth transistor (T5) and the seventh transistor (T7) are turned off. The first node (Qn) is pulled up to a higher level via capacitance coupling so as to ensure the output of Gn.

Phase three: the output signals at the next level (Gn+1) are at the low level. The ninth controllable switch T9 is turned on, the first node (Qn) is pulled up to the high level, the second clock signals (XCK) are at the low level, and the second node (Pn) is pulled down to the low level, and the fifth transistor (T5) and the sixth transistor (T6) are turned on.

Phase four: the first clock signals (CK) are at the low level, the fourth transistor (T4) is turned on, the first node (Qn) is pulled up to the high level again. During the process after one frame, the first node (Qn) and the second node (Pn) remain at the high level and the low level.

The operations of the backward scanning are similar to the above. The only difference resides in that the (Gn+1)-level becomes the (Gn−1)-level. In addition, the first scanning signals (Vf) and the second scanning signals (Vr) are respectively the high level scanning signals and the low level scanning signals. The details of the four phases of the backward scanning are omitted hereinafter.

In an embodiment, a direct current (DC) controlled source and a switch component are included. The DC source is adopted to charge/discharge Qn. In this way, Q point is kept at a reasonable level, and the transfer capability is enhanced. In addition, the forward scanning and the backward scanning may be implemented.

Figure 3:
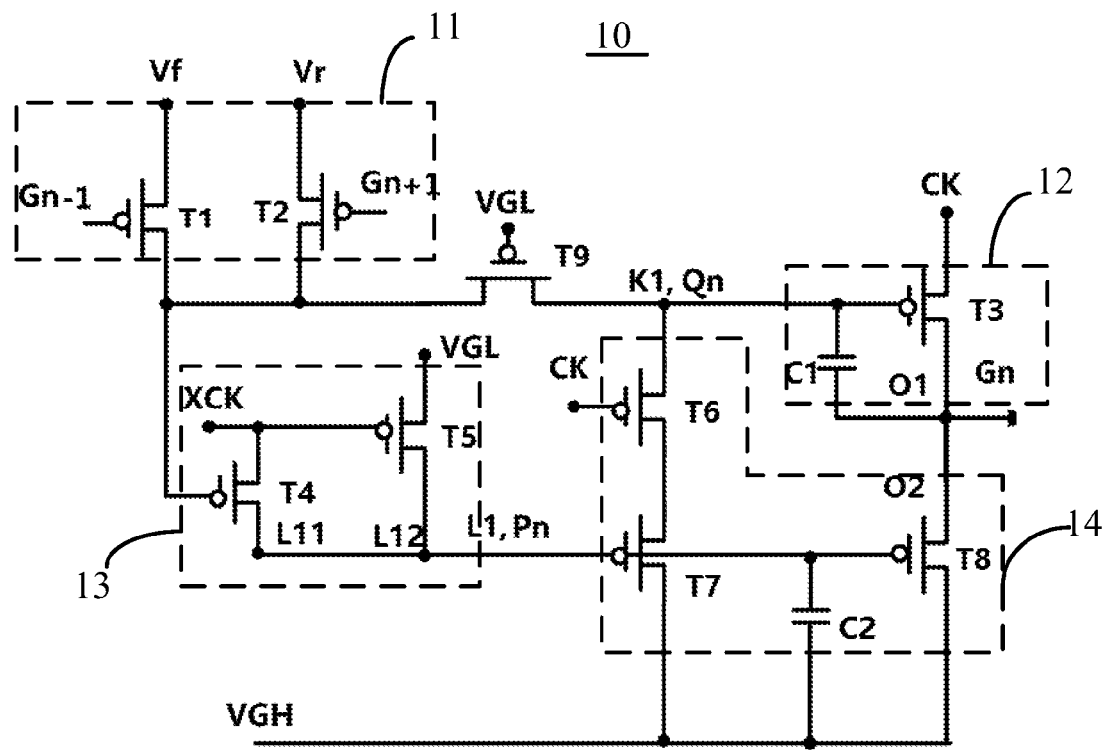
FIG. 3 is a schematic view of the GOA driving unit at the n-th level of the GOA driving circuit in accordance with a second embodiment.

FIG. 3 is a schematic view of the GOA driving unit at the n-th level of the GOA driving circuit in accordance with a second embodiment. The difference between the GOA circuit in the second embodiment and the first embodiment resides in that the GOA driving circuit further includes a ninth transistor (T9). The control end of the ninth transistor (T9) receives the low level signals (VGL), the input end of the ninth transistor (T9) connects to the output end of the second transistor (T2), the output end of the ninth transistor (T9) connects to the control end of the third transistor (T3). The ninth transistor (T9) ensures that: when the first control signals (K1) of the first node (Qn) is coupled at a lower level, the ninth transistor (T9) is turned off. In this way, the level of the first control signals (K1) of the first node (Qn) is prevented from being affected.

Figure 4:
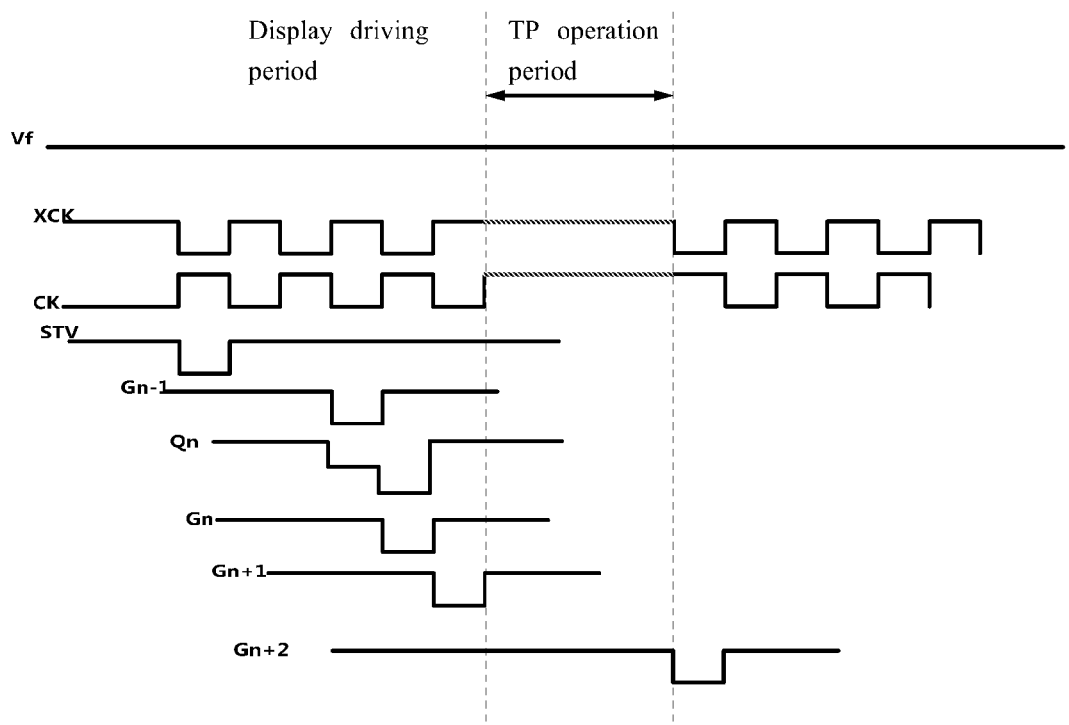
FIG. 4 is a driving timing diagram of the GOA driving unit in accordance with a third embodiment.

In the third embodiment, the GOA driving circuit is the same with the driving circuit in FIG. 1. The GOA driving unit 10 at the N-th level includes the input module, the output module, the pull-down module and the pull-down maintaining module. The difference between the third embodiment and the first embodiment resides in that: the first transistor (T1) receives the first scanning signals (Vf). FIG. 4 shows a display driving period and TP operation period, wherein the display driving period includes the four phases as disclosed in the first embodiment.

In addition, the GOA circuit in the embodiment also includes the ninth transistor (T9). The control end of the ninth transistor (T9) receives the low level signals (VGL), the input end of the ninth transistor (T9) connects to the output end of the second transistor (T2), and the output end of the ninth transistor (T9) connects to the control end of the third transistor (T3). Similarly, the level of the first control signals (K1) of the first node (Qn) is prevented from being affected as discussed in the second embodiment.

Figure 5:
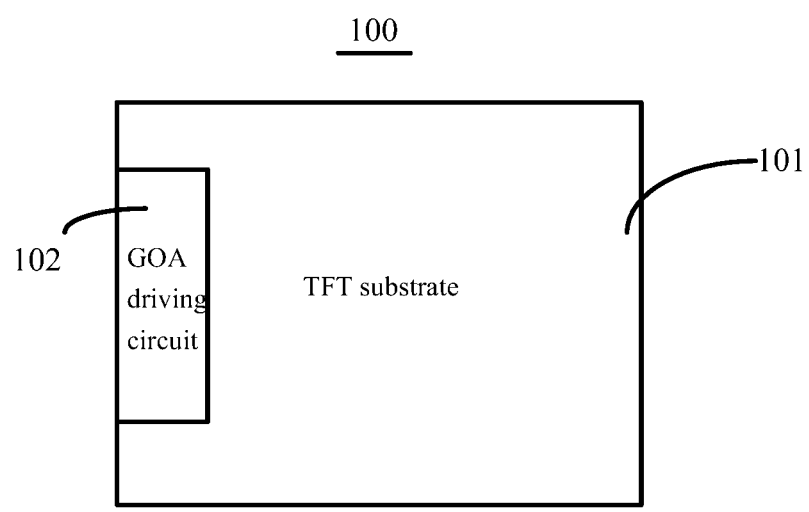
FIG. 5 is a schematic view of the display device in accordance with a fourth embodiment.

FIG. 5 is a schematic view of the display device in accordance with a fourth embodiment. In the embodiment, the display device 100 includes a TFT substrate 101 and a GOA driving circuit 102 arranged at a lateral side of the TFT substrate 101, wherein the GOA driving circuit 102 includes a plurality of above GOA driving units 10.

In view of the above, the DC source is adopted to charge/discharge Qn. In this way, Q point is kept at a reasonable level, and the transfer capability is enhanced. In addition, the forward scanning and the backward scanning may be implemented. At the same time, the level of the first control signals may be prevented from being affected. In addition, only nine transistor and two capacitors are needed, which can reduce the IC cost.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display device, comprising:
a thin film transistor (TFT) substrate includes a gate driver on array (GOA) driving circuit, wherein the GOA driving circuit includes a plurality of driving unit at multiple levels, and wherein each of the driving units comprises:
an input module configured to receive display scanning signals or touch scanning signals, output signals at a previous level, and output signals at a next level, wherein the input module is configured to output first control signals in accordance with the received display scanning signals or the touch scanning signals;
an output module configured to receive the first control signals and first clock signals, wherein the output module is configured to output first output control signals in accordance with the first control signals and the first clock signals;
a pull-down module configured to receive the first control signals, second clock signals, and low level signals, wherein the pull-down module is configured to output pull-down signals in accordance with the first control signals, the second clock signals, and the low level signals, wherein the second clock signals and the first clock signals are inversed; and
a pull-down maintaining module configured to receive the pull-down signal, high level signals, and the first clock signals, and
wherein the pull-down maintaining module is configured to output second output control signals in accordance with the pull-down signals, the high level signals, and the first clock signals, wherein the first output control signals and the second output control signals cooperatively operate to obtain the output signals,
wherein the input module comprises a first transistor configured to receive the touch scanning signals, and a second transistor configured to receive the display scanning signals, the scanning signals are high level scanning signals and low level scanning signals,
wherein a control end of the first transistor configured to receive the output signals at the previous level, an input end of the first transistor configured to receive the high level scanning signals or the low level scanning signals, and an output end of the first transistor configured to output the first control signals; and a control end of the second transistor configured to receive the output signals at the next level, an input end of the second transistor configured to receive the high level scanning signals or the low level scanning signals, and the output end of the first transistor configured to output the first control signals,
wherein the output module comprises a third transistor and a first capacitor, wherein a control end of the third transistor is connected to the output end of the second transistor to receive the first control signals, an input end of the third transistor configured to receive the first clock signals, and an output end of the third transistor configured to output the first output control signals; and two ends of the first capacitor respectively are connected to the control end and the output end of the third transistor,
wherein the pull-down signals comprises first pull-down signals and second pull-down signals, and
the pull-down module comprises a fourth transistor and a fifth transistor,
wherein a control end of the fourth transistor is connected to the output end of the second transistor to receive the first control signals, and an input end of the fourth transistor configured to receive the second clock signals, and an output end of the fourth transistor configured to output the first pull-down signals; and a control end of the fifth transistor configured to receive the second clock signals, an input end of the fifth transistor configured to receive the low level signals, and an output end of the fifth transistor configured to output the second pull-down signals,
wherein the pull-down maintaining module comprises a sixth transistor, a seventh transistor, an eighth transistor, and a second capacitor,
wherein a control end of the sixth transistor configured to receive the first clock signals, an input end of the sixth transistor is connected to an output end of the seventh transistor, an output end of the sixth transistor is connected to the control end of the third transistor; and
a control end of the seventh transistor respectively is connected to the output ends of the fourth transistor and the fifth transistor to receive the pull-down signals, an input end of the seventh transistor configured to receive the high level signals, an output end of the seventh transistor is connected with the input end of the sixth transistor; a control end of the eighth transistor respectively is connected with the output ends of the fourth transistor and the fifth transistor to receive the pull-down signals, an input end of the eighth transistor configured to receive the high level signals, and an output end of the eighth transistor configured to output the second output control signals; and one end of the second capacitor is connected with the control ends of the seventh transistor and the eighth transistor, and the other end of the second capacitor configured to receive the high level signals.

* * * * *